(No Model.)

E. D. OLIN.
SIDE BAR VEHICLE.

No. 387,987. Patented Aug. 14, 1888.

Witnesses:
Horace W. Males
A. S. Males

Inventor:
Edwin D. Olin
By his Attorney Geo. J. Murray

UNITED STATES PATENT OFFICE.

EDWIN D. OLIN, OF AVONDALE, OHIO.

SIDE-BAR VEHICLE.

SPECIFICATION forming part of Letters Patent No. 387,987, dated August 14, 1888.

Application filed April 25, 1887. Serial No. 235,994. (No model.)

*To all whom it may concern:*

Be it known that I, EDWIN D. OLIN, a citizen of the United States, and a resident of Avondale, in the county of Hamilton and State of Ohio, have invented certain new and useful Improvements in Side-Bar Vehicles, of which the following is a specification.

My invention is an improvement in side-bar vehicles.

It relates to that class used as light delivery-wagons, and especially to such wagons as are used by sewing-machine agents. Its object is to provide a vehicle which has all the strength required, combined with the easy-riding qualities of a side-bar buggy, and which has the body dropped low, so as to be easily accessible from the rear for loading and unloading. Its object is also to prevent the rotation of the axle, and so couple the gear that the body-supporting springs may be advantageously placed under the body at the points desired for the best results commensurate with the duty required.

Figure 1:
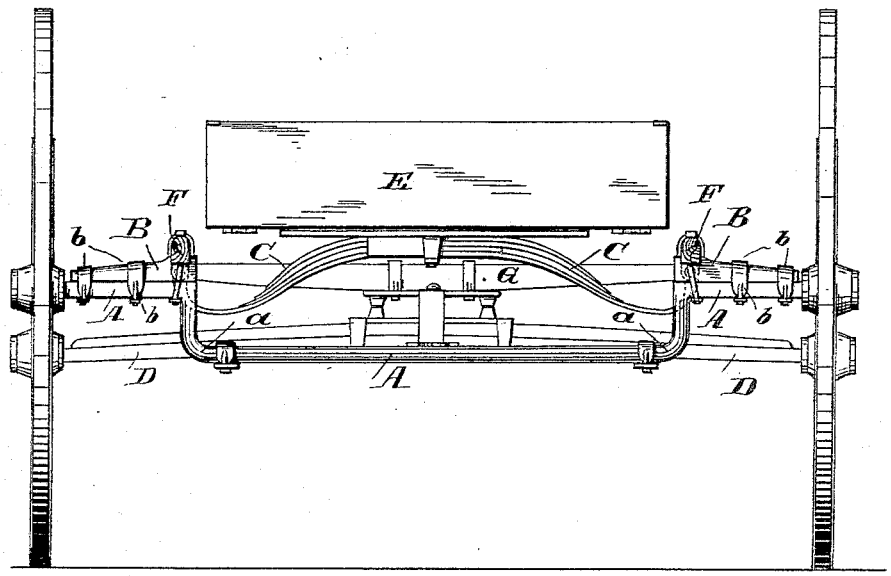
Figure 2:
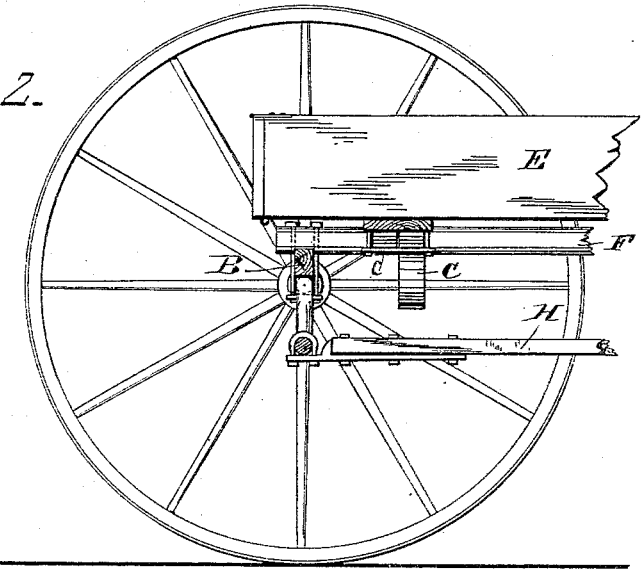

In the accompanying drawings, in which like parts are represented by the same reference-letters wherever they occur, Figure 1 is an end elevation of a vehicle embodying my improvements, and Fig. 2 is a central vertical longitudinal section of the rear part of the same.

Heretofore it has been quite common to make a downward bend in either one or both of the axles, and to support the vehicle-body upon cross-springs the outer ends of which were clipped in various ways to the bent portion of the axle or axles. The objections to these forms are that they tend to cause partial rotation of the axle and the consequent injurious effects; second, that they prevent a short coupling of the gear, which experience has found to be the most desirable; and, third, that they leave no limit for the adjustment of the springs with relation to the axle. These difficulties are all overcome by my invention, which permits unlimited adjustment of the springs, and, firmly bracing the gear by the double perch and side bars, prevents rotation of the axle, enables the gear to be shortly coupled up, and secures the low hanging of the body and the easy accessibility from the rear for the purpose of loading and unloading.

The rear axle, A, is constructed with a downward bend, *a*, in the usual manner, and on the top it has a wooden cap, B, held on the ends of the axle by clips *b b*. Aside from the downward bend in the rear axle, the balance of the running-gear, including the cross-springs C, front axle D, bolsters G, and the body E, is constructed in the usual manner. The side bars, F, are clipped upon the axle-caps B B and front bolster G in the same manner that they are usually clipped upon side-bar buggies, and the cross-springs C, which connect the body E and running-gear, may be of any approved construction; but for strength, combined with elasticity, I prefer to use the Olin spring shown.

The double reach H, connecting the rear axle and king-bolt with the side bars, F, firmly clipped upon the rear axle and front bolster, keeps the gear in shape and prevents the rotation of the axle, and this is the best form of gear to use in my improved wagon; but it is obvious that a single reach may be used by employing the customary braces from it to the rear axle, and also that a reach of any kind may be entirely dispensed with by employing braces from the rear axle to the side bars, as is now usually done in side-bar vehicles, provided the side bars are made sufficiently rigid.

In constructing my wagon any of the well-known gear-irons or fifth-wheels may be employed for connecting either a double or single reach with the king-bolt, and any ordinary fifth-wheel when the reach or perch is omitted.

What I claim is—

The combination of the bent rear axle, the rigid side bars clipped upon the rear axle and front bolster, the wagon-body, and the cross-springs connecting the body and side bars, substantially as shown and described.

EDWIN D. OLIN.

Witnesses:
 GEO. J. MURRAY,
 MARY L. MURRAY.